SEARCH ROOM

Nov. 1, 1960 E. LABIN ET AL 2,958,767

FREQUENCY CONTROLLING SYSTEM

Filed Oct. 2, 1944 3 Sheets-Sheet 1

INVENTORS
EMILE LABIN
SIDNEY FRANKEL

BY Percy P. Lantzy
ATTORNEY

INVENTORS
EMILE LABIN
SIDNEY FRANKEL
BY
Percy P. Lantzy
ATTORNEY

Nov. 1, 1960 E. LABIN ET AL 2,958,767

FREQUENCY CONTROLLING SYSTEM

Filed Oct. 2, 1944 3 Sheets-Sheet 3

INVENTORS
EMILE LABIN
SIDNEY FRANKEL

BY Percy P. Lantzy
ATTORNEY

United States Patent Office 2,958,767

Patented Nov. 1, 1960

2,958,767

FREQUENCY CONTROLLING SYSTEM

Emile Labin, New York, and Sidney Frankel, Forest Hills, N.Y., assignors to International Telephone and Telegraph Corporation, a corporation of Maryland Filed Oct. 2, 1944, Ser. No. 556,742

18 Claims. (Cl. 250—13)

This invention relates to radio receiver-transmitter combination systems, and more particularly to radio systems for transmitting signals in accordance with the frequency of the received signals.

It is frequently desired to ascertain the presence of signals and the frequency thereof within a given band of frequencies and subsequently to duplicate the frequency of a given one of these signals in a local transmitter. Many applications will come to mind where the determination and duplication of a given frequency is useful, particularly in the field of communications, one such application being the interception of and interference with outside radio signalling in various forms, as exemplified by jamming of enemy signals in wartime.

For this purpose, systems which are generally usable in communication practice have been proposed wherein a receiving station is tuned over a band of frequencies in order to determine the operating frequency of outside transmitting stations. After such transmitting stations have been found, and their carrier frequency ascertained, signals are transmitted on the same carrier frequency which may be modulated at a high level with noise signals to substantially blanket the undesired communications. In some of these proposed systems a so-called panoramic receiver is provided which is continuously tunable over particular frequency bands so that communications may be continuously detected even though the frequency of transmission is periodically changed.

Combination radio systems of the type referred to have been proposed in the past which employed mechanical scanning means for the receiver and automatic mechanical tuning in the transmitter. Under certain conditions, however, it is of advantage to utilize completely electronic methods for scanning and tuning.

It is accordingly an object of this invention to provide a combination radio system of the type referred to wherein all scanning and tuning processes are electrical.

It is a further object to provide a combination radio system which lends itself to the selection of one of a plurality of outside signal frequencies for the purpose of locally generating a duplication thereof.

Another object is to provide automatically acting electronic means for the determination in the transmitter of the combination system of the transmitting frequency in accordance with the selected received signal frequency.

Another object is to provide automatic frequency control to correct for drift from the automatically determined tuned frequency value in the transmitter of the combination.

A further object is to provide for a combination transmitter which will shift automatically to another frequency if the selected frequency is absent.

In accordance with certain features of our invention, the receiver and the transmitter are arranged to scan a narrow band frequency spectrum in the high frequency range simultaneously and by electronic means during a small fraction of the total time. The presence of a signal in the spectrum produces a pulse in the receiver output circuits. If several signals at different frequencies are present, several pulses, one corresponding to each frequency will be produced. In the first instance the circuits are so arranged that the first pulses so produced during a scanning cycle will stop the scanning of the transmitter at the frequency corresponding to that pulse. The transmitter is thereby tuned to that frequency. Should it, however, be desired that the transmitter be tuned to a frequency not corresponding to the first pulse, but to some other frequency elsewhere in the band, the circuits are arranged to render this possible and also for the transmitter to tune to alternative frequencies if a signal is not present at the desired location within the band. The combination circuits include portions, the outputs of which by comparing the one to the other, serve to correct any drift due to inherent construction of the apparatus from the frequency to which the transmitter has been tuned as indicated hereinabove. An oscilloscope is provided in combination with the receiver circuit to facilitate the observation of the incoming signals and to assist in the operations of the apparatus generally.

These and other objects and features of our invention will be better understood from the particular description made with reference to the accompanying drawings in which;

Fig. 4 is a diagrammatic representation of the screen of the cathode ray oscilloscope of the apparatus when a plurality of signals have been obtained within the frequency band scanned by the receiver, while:

Figure 1:
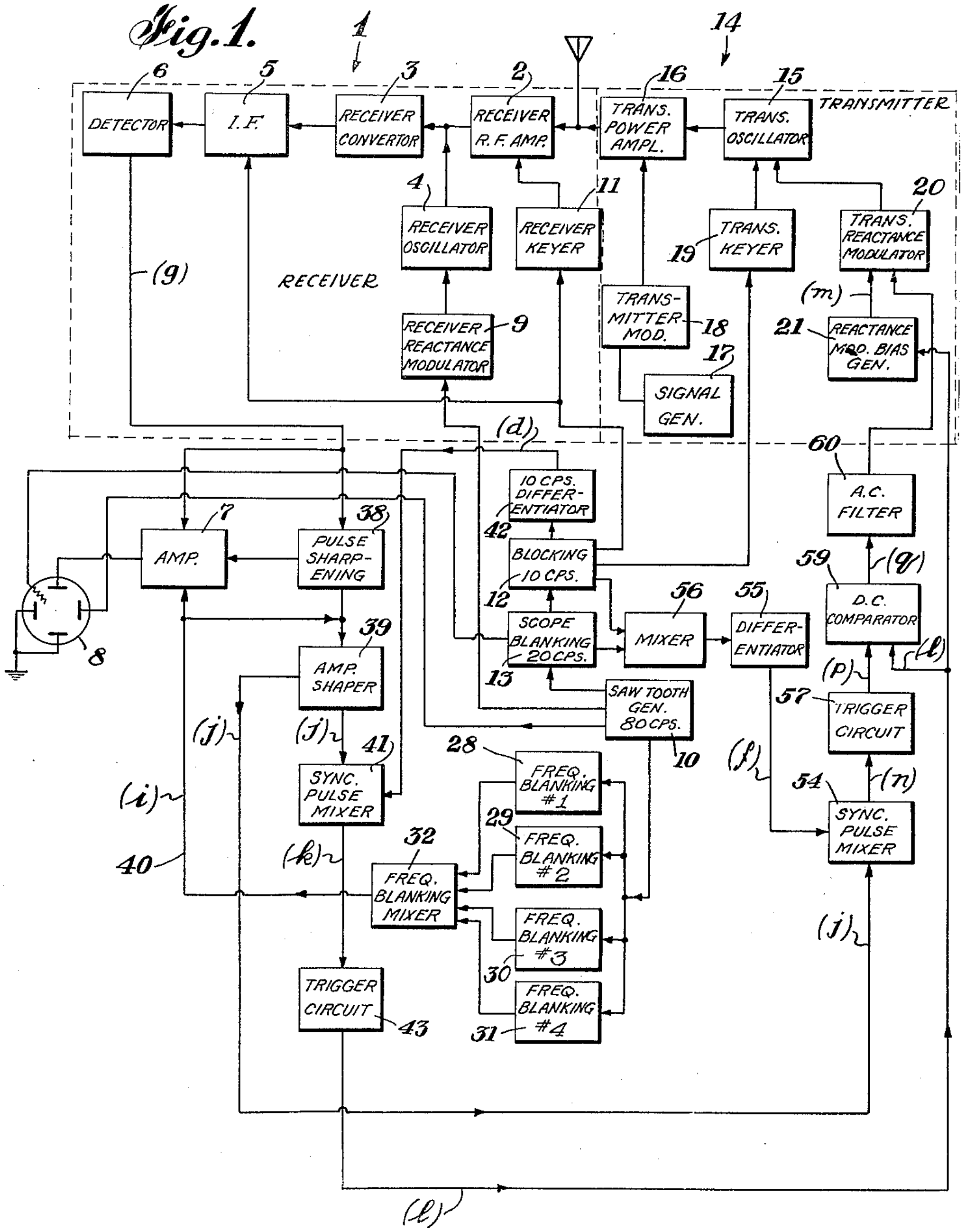
Fig. 1 is a block diagram of a combination receiver-transmitter circuit embodying the features of our invention.
Figure 5:
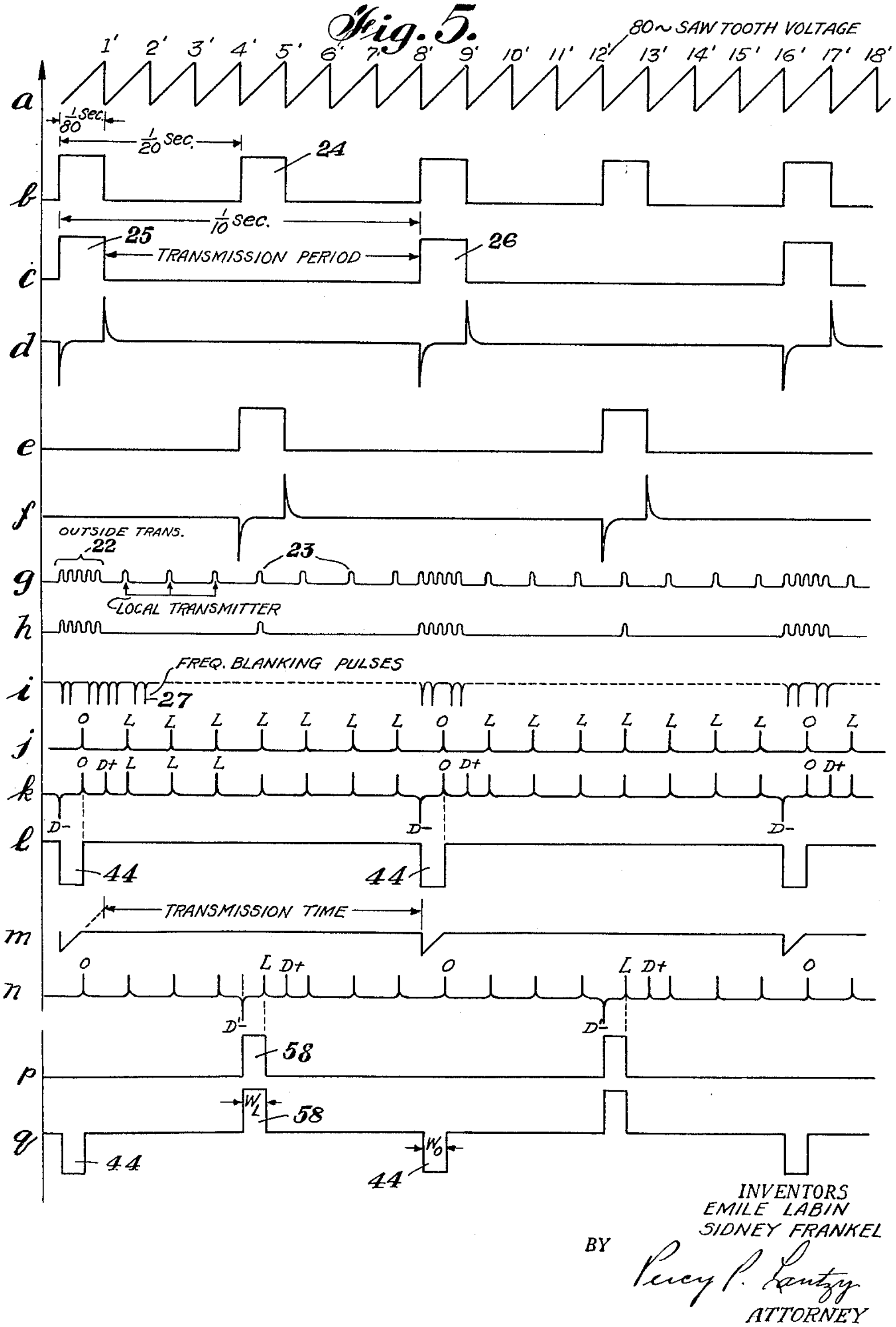
Fig. 5 is a set of graphs illustrating various wave forms which serve to explain the operation of the system.

In Fig. 1 there is shown a receiver circuit 1 comprising a conventional receiver radio frequency amplifier 2, the high frequency output of which is beat in a receiver converter 3 with the output of a local receiver oscillator 4, to result in an intermediate frequency signal which is amplified in an intermediate frequency amplifier 5. The amplified intermediate frequency signal is then detected in a detector 6 and after being amplified in an amplifier 7 is applied as a deflection voltage to the vertical deflection plates of an oscilloscope 8. The main portions of the receiver just described are of the fix-tuned type, the receiver being continuously and periodically scan-tuned over a given frequency range by means of a variation of the output frequency of the receiver oscillator 4. In order to obtain a suitable frequency sweep, there is included in the receiver oscillator circuit 4, a so-called reactance modulator 9 which may be a reactance type tube forming a part of the oscilloscope circuit and which receives a saw-tooth type energization voltage wave, for example, a 80-cycles per second, from a saw-tooth wave generator 10 as illustrated in graph *a* of Fig. 5. As is well understood, the voltage variation on the grid of the reactance modulator 9 is substantially directly transformed into an analogous frequency variation of the oscillator 4. Associated with the receiver, there is shown a receiver keyer circuit 11 which is effective in providing alternate partial-blocking and unblocking of the receiver radio frequency circuits by furnishing a square pulse type wave of the type shown at *c* in Fig. 5, for example, of 10-cycles per second, originating from a 10-cycle per second wave generator 12.

The saw-tooth generator 10 is used to energize a multivibrator 13 operating, for example, at 20 cycles per second, which in turn serves to energize the 10-cycle wave generator 12, and which has additional functions to be described hereinbelow. The saw-tooth voltage is also applied to the horizontal deflection electrode of oscilloscope 8 as a sweep voltage therefor.

A transmitter circuit portion 14 of the combination apparatus is comprised in the main of a transmitter oscillator 15 and a transmitter power amplifier 16 receiving a modulating voltage originating in a signal generator 17 and a transmitter modulator 18. The transmitter oscillating circuit 15 is alternately blocked and unblocked from the 10-cycle blocking wave generator 12 through a transmitter keyer circuit 19, the blocking occurring when the receiver is unblocked and vice-versa. The frequency of the transmitter oscillator 15 is adapted to be varied within a given band by having incorporated as a part thereof, a so-called transmitter reactance modulator circuit 20 which in principle, is similar to the modulator circuit 9 of the receiver. That is to say, that a variable voltage applied to the grid of such a reactance tube is translated into a variation of the frequency of the oscillator 15 by a change in the parameters thereby. The frequency determining voltage for the reactance circuit 20 is supplied from a reactance modulator bias generator 21 which will be described in greater detail in connection with Fig. 3.

The voltage for energizing the bias generator 21 is obtained from a frequency determining circuit portion energized by the incoming signals as will become apparent presently.

Figure 4:
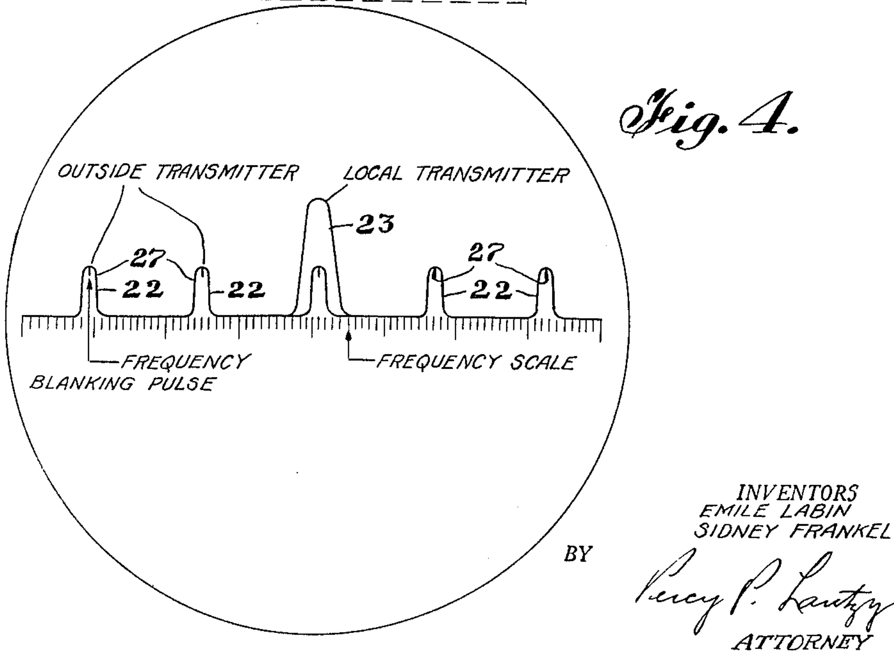

In accordance with the saw-tooth type control voltage referred to hereinabove, the receiver is being scanned over a given frequency band at the rate of eighty times per second (graph *a*). At the same time the receiver and transmitter are alternately blocked and unblocked through their respective keyer tubes so that the transmitter is enabled to send for seven scanning cycles while the receiver radio amplifier is disabled. Thereupon the receiver will accept signals for one scanning cycle while the transmitter is disabled—this whole process being repeated at the rate of ten times per second. In graph *a* the individual 1/80 second periods are indicated by successive primed integers, 1′ through 18′. From this and from the description given above, it will be seen that the receiver has normal sensitivity during cycles 1′, 9′, 17′, etc. During cycles 2′ to 8′, 10′ to 16′ etc., the receiver radio frequency amplifier is completely blocked by the action of the keyer tube, but the converter will nevertheless accept a small signal of the local transmitter 14 through stray coupling during these periods. Thus, for instance, with five outside signals observable in the receivable spectrum, the signal output from the detector will be somewhat as shown in graph *g*, the five outside signals being indicated at 22, and the local transmitter signals at 23. However, since the oscilloscope is being enabled by the application of a 20-cycle per second wave from the 20-cycle multi-vibrator 13 in accordance with graph *b*, the effective signal which will be observed on the screen is that shown in graph *h*. This graph indicates that the oscilliscope screen will show the five outside transmitter signals ten times per second and the one local transmitter signal occurring during the transmission time and coincident wtih the enabling pulse 24, graph *b*, of the 20-cycle wave intermediate the two pulses, 25 and 26, graph *c*, of the 10-cycle keying wave when the receiver is receiving outside signals and the transmitter is blocked off. The combined observable trace on the oscilloscope screen may be seen in Fig. 4 wherein the signal of the local transmitter is seen to be superimposed on the trace due to the five outside signals. At 27, in Fig. 4, shown centrally located with respect to each of the five outside signal traces, there is visible the trace of a so-called frequency blanking pulse which may be obtained from frequency blanking circuits 28 through 31 and a frequency blanking mixer circuit 32, adapted to combine the pulse outputs of the circuits 28 through 31 and to feed such combined output into the oscilloscope amplifier 7 for application to the oscilloscope deflection plates.

Figure 2:
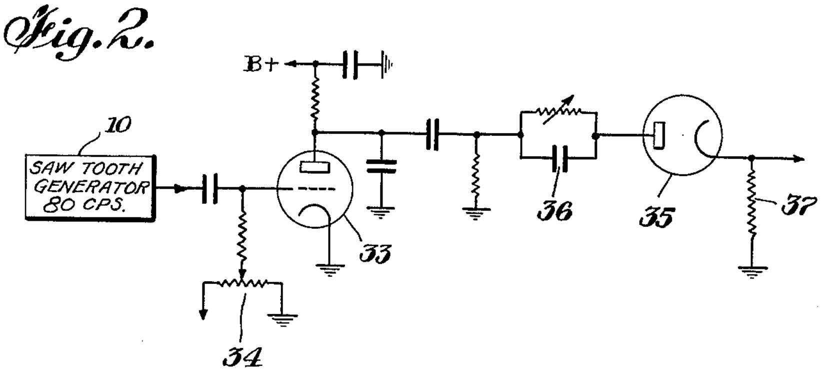
Fig. 2 is a schematic representation of a frequency determining or blanking circuit forming a part of the circuit shown in blocked form in Fig. 1.

A typical frequency blanking circuit is illustrated schematically in Fig. 2 which forms the subject matter of the copending application of S. Frankel, Serial No. 556,741, filed October 2, 1944, Patent No. 2,643,331 and which will, therefore, be described only briefly. The frequency blanking circuit comprises an amplifier 33, the grid of which receives the saw-tooth voltage wave from the generator 10 and in whose plate circuit several capacitors are permitted to charge during the cut-off period of the tube. The cut-off period of the tube is determined by adjustment of a grid circuit bias at 34, and permits thereby the positioning of the ultimately resulting frequency blanking pulses as will become apparent. The output of this amplifier is fed to a diode rectifier 35 with a capacitance resistance filter circuit 36. As is well known, periodic voltages when applied to such circuits will draw a comparatively sharp pulse of current, the sharpness of the pulse being roughly proportionate to the time constant of the circuits. A resistance 37 in series with such circuits will produce a voltage proportionate to the current pulses. The width of these voltage pulses may be varied by varying the time constant of the circuit 36. An adjustment of the width of the frequency blanking pulses may thus be had. Since the output pulses of the diode rectifier will coincide with the peaks of the voltage applied thereto, the shifting in position of the cut-off period of tube 33 at which point the maximum or peak of the plate voltage occurs, has the effect of shifting in time or phase the pulses resulting from the original saw-tooth wave. The circuits 28 through 31 thus provide pulses, used subsequently for blanking out any one or more of the scan signals seen on the oscilloscope screen, which may be adjusted in phase as well as in width to facilitate their blanking function. The four impulse waves from the four frequency blanking circuits, timed to different instants of the sweep cycle, are mixed with each other in the frequency blanking mixer 32 and with the signal from the detector 6 in the grid circuit of the amplifier 7. The blanking pulses are of opposite polarity to the received signals and of the same or greater amplitude so that mutual and effective cancellation takes place. These impulses may be set to occur as explained above, at any point of the cycle; specifically, they may be set to coincide with and thereby blank out the first, second, fourth and fifth signal. The wave form resulting from the four mixed blanking pulses is shown in graph *i*. Consequently, the output of the amplifier 7 appears as in graph *j* where the one non-blanked outside signal obtained from the receiver is designated by the reference O and the locally generated signal by the reference L. The amplifier 7, thus, will amplify only those signals of the ones shown in graph *g* for which it is not blanked out by the blanking pulses in accordance with graph *i*, while it will reject all other signals. The amplifier 7 also receives signal pulses originating from the detector 6 through a pulse sharpener circuit 38 which is supplying the detected and sharpened signal pulses of the receiver to an amplifier-shaper 39. The amplifier shaper, in addition, receives the output of the frequency blanking mixer 32 over a connection 40 so that its output is substantially as shown in graph *j*. The pulse wave of the amplifier-shaper 39, in accordance with graph *j*, is mixed with a differentiated wave shown in graph *d* in a synchronizing pulse mixer 41, the differentiated wave coming from the 10-cycle multivibrator 12 through a differentiator circuit 42. The resultant of this mixture appears as in graph *k*. The application of this mixed pulse train of graph *k* to a trigger circuit 43 of the Eccles-Jordan type produces a 10-cycle pulse wave as shown in graph L. It will be noticed that the negative pulse D-(graph *k*) causes a voltage pulse to be produced in accordance with 44 in graph L which is terminated by the next following positive impulse 0 in this case due to the outside signal as selected by means of the frequency blanking circuits. It is apparent, therefore, that the width of the pulse 44 is indicative of the particular frequency of the signal occurring at 0 since it measures the time from the start of the frequency scan cycle to the point at which the pulse 44 is ended. The output of the trigger circuit 43, in accordance with graph L, in turn is applied to and controls the operation of the modulating bias generator 21 in the circuit of the transmitter 14.

Figure 3:
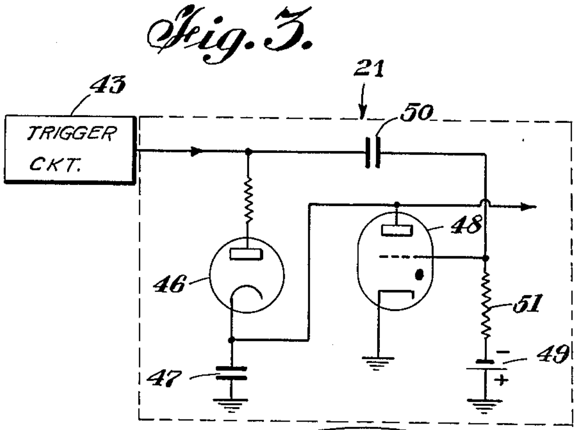
Fig. 3 is a schematic representation of a bias voltage generator for the transmitter of the circuit of Fig. 1.
Figure 3A:
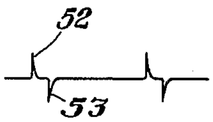
Fig. 3A is a graph of a wave form useful in explaining the operation of the circuit in Fig. 3.

The bias generator 21 as shown in schematic form in Fig. 3 is comprised of a diode 46 in the cathode circuit of which there is a capacity 47 adapted to be short circuited to ground by a gas-filled triode 48 when the latter becomes conductive. The conductivity of the triode 48 is controlled by the negative bias 49 on the grid thereof and the differentiator circuit consisting of a capacity 50 and the resistor 51. As the pulse 44, with its actual polarity the reverse of what is shown, is applied to the diode 46, the leading edge of the pulse renders it conductive and permits the condenser 47 to build up a charge; at the same time the pulse 44 is applied to the differentiating circuit 50—51. The leading edge of this pulse 44 will cause in the differentiating circuit a positive impulse as at 52 (Fig. 3A) to render the triode 48 conductive, whereby the condenser 47 is cleared of any charge that may be left thereon. Following the positive impulse 52, the triode immediately becomes non-conductive again permitting the condenser 47 to charge for the duration of the pulse 44. At the end of the pulse 44, the diode 46 returns to the non-conductive state, the triode 48 having remained non-conductive during the entire pulse. A negative impulse 53 from the differentiator circuit due to the trailing edge of the pulse 44 does not affect the conductivity of the triode 48 which is normally negatively biased as shown at 49. During the interval between pulses 44, which is also the transmission period of the local transmitter 14 in accordance with the keying wave illustrated in graph *c*, the voltage output of the bias generating circuit 21 to the reactance modulator 20 remains at a constant value determined by the trailing edge of the pulse 44 which interrupts the conductivity of the diode 46. It will be seen, therefore, that the width of the pulses 44 is a controlling factor as regards the value of the biasing voltage supply to the transmitter reactance modulator 20 and thereby of the frequency of the transmitting circuit. The voltage output of the biasing voltage generator 21 during and between the pulses 44 is shown in graph *m*, where it is seen that the voltage output of the generator is obtained from the condenser 47 indicating a substantially exponential charging up of the condenser for the width of the pulses 44 and a constant value biasing voltage intermediate these pulses when the diode 46 is nonconductant. The value of this constant biasing voltage depends upon the point of time at which the trailing edge of the pulses 44 appears with respect to the exponentially increasing condenser voltage. Since the trailing edge of the pulses 44 is due to the impulses 0 in graph *k*, in other words, due to the selected outside signal, the width of the pulses 44 is a medium for tuning the frequency of the transmitter to that of the selected outside signal.

As an alternative, the frequency blanking pulses may be set to leave two, instead of one of the five signals shown unblanked. For example, in graphs *g* and *i*, the third signal is shown to be unblanked. If the unblanking pulses are adjusted also to unblank, say, the fifth signal, the pulses 44 would assume a width measured from the negative impulse D— to the positive impulse 0 due to the fifth signal, if the third signal were not present. That is, an automatic shift in the frequency of the transmitter would be thus achieved. It will be apparent, however, that such a frequency shift is operable in one direction only, from a lower to a higher frequency, if the scanning sweep is in that sense.

In the circuits just described, critical adjustments of the sweep and bias voltages are required to insure that the transmitter will attune to the correct frequency.

Furthermore, aging of tubes varying in temperature, and so forth, will cause a frequency drift in the transmitter oscillator with consequent deviation from the desired tuned frequency which remains uncompensated in the circuits disclosed so far. In order to correct this frequency drift, an additional biasing voltage is obtained as a correcting factor from the circuits about to be described and referred to herein as the transmitter automatic frequency control circuits. These comprise a pulse mixer 54 which receives on the one hand, the output of the amplifier-shaper 39 in accordance with graph *j*. On the other hand, it also receives the output of a differentiator circuit 55 which latter serves to differentiate in accordance with graph *f*, the square pulse wave of graph *e*. This wave of graph *e* is a resultant of the combination obtained in a mixer circuit 56 of the 10-cycle multivibrator 12 and the 20-cycle multi-vibrator 13, the outputs of which are represented in graphs *c* and *b* respectively. The combination of the wave forms of graphs *f* and *j*, as indicated in graph *n*, is applied to a trigger circuit 57 similar to the trigger circuit 43 previously referred to. The function of these two trigger circuits is similar except that in the case of the circuit 57, the resulting pulse wave (graph *p*) is productive of a square pulse 58, the width of which is a measure of the frequency of the local transmitter, the distance between the leading and the trailing edge being given by the distance between the negative impulse D′— and the following positive impulse L due to local transmitter signal, all as shown in graph *n*. The pulses 58 are then, after having their peaks equalized with those of the wave form of graph L applied to a D.C. comparator circuit 59 to result in the voltage wave form of graph *q*, which is made up of a succession of pulses 58 and 44. Referring to this graph *q*, it will be recalled that the width $W_o$ of the pulse 44 is proportional to the frequency of the outside signal; similarly the width $W_L$ of the pulse 58 is proportional to the frequency of the local transmitter 14. If $W_L$ is larger than $W_o$, the signal has a positive D.C. component in the form as indicated, while if $W_L$ is smaller than $W_o$, the D.C. component is negative. This resultant D.C. component, obtained after filtering out the A.C. in a filtering circuit 60, is applied to the grid of the transmitter reactance modulator 20 to supply an additional and corrective bias therefor and thereby shifts the transmitter frequency in such a way as to equalize the frequency of the transmitter with that of the selected signal—resulting in a close duplication of the received outside signal by the local transmitter.

It is thus apparent that upon the receipt of a plurality of outside signals within a given frequency band, any one of these signals may be selected as to their carrier frequency by means of an adjustment in the frequency blanking circuits 28 through 31, whereupon an automatic tuning of the transmitter frequency may be obtained and be precisely held to this value by means of the automatic frequency control circuits as described.

While we have described particular embodiments of our invention in order to fully explain the operation of the system, it should be distinctly understood that this description is given merely by way of illustration and is not intended to limit the scope of the invention.

We claim:

1. A radio system for ascertaining and duplicating the frequency of a given received signal within a predetermined frequency range, comprising in combination: receiving means, transmitting means, means for alternately energizing said receiving and said transmitting means, means for varying the frequency of transmission of said transmitting means, and means controlled by said receiving means for controlling said means for varying, whereby the frequency of a given received signal is adapted to control the transmission frequency.

2. A system in accordance with claim 1, wherein said receiving means includes electronic frequency scanning means.

3. A system in accordance with claim 1, wherein said means for controlling includes frequency selection means.

4. A radio system for ascertaining and duplicating the frequency of a given received signal within a predetermined frequency range, comprising in combination: receiving means, transmitting means, control pulse means including means for alternately energizing said receiving and said transmitting means, means for varying the frequency of transmission of said transmitting means, means for selecting at least one frequency within said range; and means controlled by said receiving means, said energizing means and said frequency selecting means for controlling said varying means, whereby the frequency of a given selected signal is adapted to control the transmission frequency.

5. A system in accordance with claim 4, wherein said frequency selecting means is connected for energization to said control pulse means and includes a part for producing pulses adjustable for position in time.

6. A system in accordance with claim 4, wherein said means for controlling includes a trigger type circuit for generating pulses the width of which is controlled by said frequency selecting means and said control pulse means.

7. A system in accordance with claim 4, wherein said control pulse means includes a part for scan-tuning said receiving means.

8. A radio system for ascertaining and duplicating the frequency of a given received signal within a predetermined frequency range, comprising in combination: receiving means, transmitting means, control pulse means including means for alternately energizing said receiving and said transmitting means, means for varying the frequency of transmission of said transmitting means; and means including a pulse generating circuit controlled by said receiving means and by said energizing means for controlling said varying means, whereby the frequency of a given received signal is adapted to control the transmission frequency.

9. A system in accordance with claim 8, wherein said means for varying includes a reactance type modulator and a biasing voltage generator therefor.

10. A radio system for ascertaining and duplicating the frequency of a given received signal within a predetermined frequency range, comprising in combination: receiving means, transmitting means, control pulse means including means for alternately energizing said receiving and said transmitting means, means for varying the frequency of transmission of said transmitting means, means controlled by said receiving means for controlling said means for varying, and means for maintaining the frequency as established by said means for varying associated therewith, whereby the frequency of a given received signal is adapted to precisely control the transmission frequency.

11. A system in accordance with claim 10, wherein said means for maintaining includes a comparator circuit operatively associated with said means for controlling and said control pulse and receiving means.

12. A system in accordance with claim 10, wherein said means for controlling and said means for maintaining each include a trigger circuit, and said means for maintaining includes a comparator circuit for comparing the outputs of said trigger circuits.

13. A system in accordance with claim 10, wherein said means for varying includes a reactance type modulator and a biasing voltage generator therefor, said means for controlling and said means for maintaining each include a trigger circuit, and said means for maintaining includes a comparator circuit for comparing the outputs of said trigger circuits controlled by said receiving and control pulse means, said comparator circuit being operatively associated with said modulator for supplying a supplementary corrective bias voltage thereto.

14. A radio system for ascertaining and duplicating the frequency of a given received signal within a predetermined frequency range, comprising in combination: receiving means, means for indicating the received signals associated with said receiving means, transmitting means, means for alternately energizing said receiving and said transmitting means, means for varying the frequency of transmission of said transmitting means, means for selecting at least one frequency operatively associated with said means for indicating, and means controlled by said receiving means for controlling said means for varying, whereby the frequency of a given received signal may be selected and be made to control the transmission frequency.

15. A radio system for ascertaining and duplicating the frequency of a given received signal within a predetermined frequency range, comprising in combination: receiving means, transmitting means, control pulse means including means for providing voltages for alternate energization of said receiving and said transmitting means, means including a reactance type modulator and a biasing voltage generator therefor for varying the frequency of transmission of said transmitting means, means including a trigger circuit, controlled by signals from said receiving means and by the voltage energizing said receiving means, for controlling said means for varying, means including a second trigger circuit, controlled by signals from said receiving means and by the voltage energizing said transmitting means, for maintaining the frequency as established by said means for varying associated therewith, and a comparator circuit for comparing the outputs of said trigger circuits operatively associated with said modulator, whereby the frequency of a given received signal is adapted to control the transmission frequency.

16. In combination, a first circuit for producing pulses, a second circuit for producing second pulses, a comparator circuit associated with both said first named circuits, a reactance modulator connected to receive the output of said comparator circuit, and an oscillator connected to have its frequency controlled by said modulator, whereby said oscillator is adapted to be automatically adjusted with respect to its frequency in accordance with the relation of the pulses of said two first named circuits.

17. The method of controlling the frequency of an oscillator, comprising generating a first pulse the width of which is proportional to the frequency of a given control signal, generating a second pulse opposite in its sense to that of the first pulse and the width of which is proportional to the frequency of the oscillator, and utilizing the resultant of these pulses to control the frequency of the oscillator.

18. The method of duplicating the frequency of a given signal in an oscillator, comprising generating a pulse having a width proportional to the frequency of said signal, and utilizing said pulse to control the frequency determining biasing voltage for said oscillator.

References Cited in the file of this patent

UNITED STATES PATENTS

| | | |
|---|---|---|
| 1,847,160 | Affel | Mar. 1, 1932 |
| 1,953,973 | Page | Apr. 10, 1934 |
| 2,018,820 | Usselman | Oct. 29, 1935 |
| 2,104,801 | Hansell | Jan. 11, 1938 |
| 2,201,978 | Bedford | May 28, 1940 |
| 2,209,507 | Campbell | July 30, 1940 |
| 2,284,266 | Bellescize | May 26, 1942 |
| 2,363,583 | Gilman | Nov. 28, 1944 |